Figure 6:
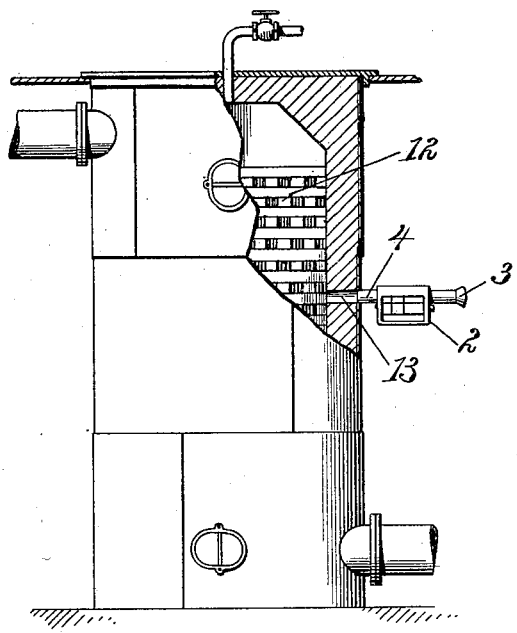

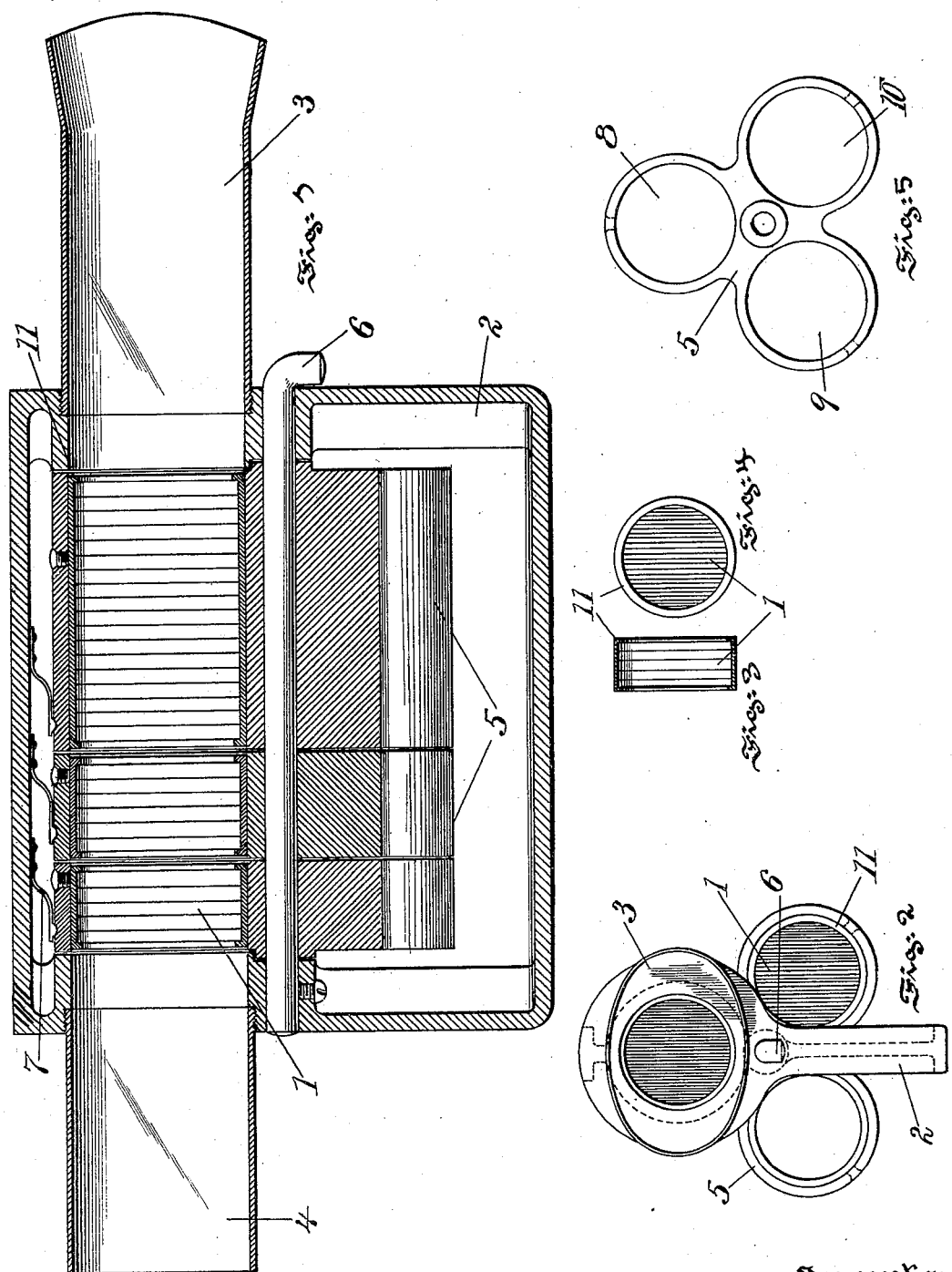

No. 711,484. Patented Oct. 21, 1902.
E. H. EARNSHAW.
PYROMETER.
(Application filed Jan. 8, 1900.)
(No Model.) 2 Sheets—Sheet 2.

UNITED STATES PATENT OFFICE.

EDWARD H. EARNSHAW, OF PHILADELPHIA, PENNSYLVANIA, ASSIGNOR TO THE UNITED GAS IMPROVEMENT COMPANY, OF PHILADELPHIA, PENNSYLVANIA, A CORPORATION OF PENNSYLVANIA.

PYROMETER.

SPECIFICATION forming part of Letters Patent No. 711,484, dated October 21, 1902.

Application filed January 8, 1900. Serial No. 792. (No model.)

*To all whom it may concern:*

Be it known that I, EDWARD H. EARNSHAW, a citizen of the United States, residing at the city of Philadelphia, in the county of Philadelphia and State of Pennsylvania, have invented a certain new and useful Pyrometer, of which the following is a specification.

The object of the present invention is to provide a compact, reliable, and efficient instrument for ascertaining the relative temperature of brickwork or other highly-heated objects and, if standardized, for ascertaining the actual temperature and for measuring light from a light-giving surface of definite area.

To these and other ends hereinafter set forth the invention, stated in general terms, comprises a series of glasses having light-obscuring quality arranged between an object-opening and an eye-opening.

The nature, characteristic features, and scope of my invention will be more fully understood from the following description, taken in connection with the accompanying drawings, forming part hereof, and in which—

Figure 1 is a transverse sectional view drawn to an enlarged scale and illustrating a pyrometer embodying features of my invention. Fig. 2 is an end view of the same looking toward the eyepiece. Figs. 3 and 4 are respectively a transverse section and a front view of a nest comprising one or more glasses. Fig. 5 is an end view illustrating one of the revolving carriers which carry the glasses; and Fig. 6 is a view, partly in section, illustrating the pyrometer in application to the fixing-chamber of a water-gas set.

In the drawings, 1 represent glasses having light-obscuring quality—such, for instance, as blue or smoked glasses. These glasses are arranged so that they may be looked through and are protected from light at their edges. Means are provided by which these glasses can be arranged in line with the object to be measured, and I will proceed with a description of novel means well adapted for the accomplishment of this result, though I do not limit my invention thereto.

2 is a casing or framework provided at one end with an eyepiece or opening 3 and at the other end with an object-piece or opening 4. These openings are arranged in line with each other, so that the operator can view the object by looking through the eyepiece. Within the casing or housing 2 there is revolubly mounted a series of carriers 5, of which the number is not material and may be increased or diminished. As shown, these carriers 5 are mounted upon the rod 6, and detents 7 are provided for preventing accidental rotation of the carriers, and each carrier is provided with several openings, as 8, 9, and 10, of which the number may be increased or diminished. Each opening in each carrier may by the rotation thereof be brought into alinement with the openings 3 and 4.

11 represents nests of glasses having the quality of obscuring light and of which the number may range from one upward indefinitely. Each nest is shown as mounted in a flanged ring. Within all but one of the openings in each carrier there is mounted a nest of the type described containing different and appropriate numbers of glasses. It results from this construction that it is possible to bring into line with the openings 3 and 4 varying numbers of glasses of the described kind by the simple operation of rotating the chambers 5, as desired.

In the art of making gas it is important to have the incandescent brickwork heated to approximately the same degree of incandescence at each run. The described instrument is well suited for this purpose, and I will proceed to describe its use in this connection with special reference to Fig. 6. In that figure, 12 indicates the brickwork which is heated, and 13 indicates a sight-opening. Assuming the temperature of the brickwork to be proper, which can be ascertained from an examination of the gas and of other conditions, the described instrument is applied to the sight-opening and the observer by rotating the carriers 5 places in the line of vision a sufficient number of glasses for just totally obscuring the light. Thereafter the observer by placing the same number of glasses in the line of sight can tell when the brickwork has attained the same temperature, because when such is the case the light will be obscured. Of course by comparison with objects of known temperature the instrument can be standardized, and then actual temperature can be ascertained by noting the number of glasses required to produce obscurity. If surfaces of definite area, like the filaments of electric lights, are observed, then the instrument may be used to determine the degree of light radiated from them which is proportional to their temperature by looking at them with the instrument and noting the number of glasses required to observe them.

It will be obvious to those skilled in the art to which my invention appertains that modifications may be made in details without departing from the spirit thereof. Hence I do not limit myself to the precise construction and arrangement of parts hereinabove set forth and illustrated in the accompanying drawings; but,

Having thus described the nature and objects of my invention, what I claim as new, and desire to secure by Letters Patent, is—

1. The combination with a frame, of an object-piece, an eyepiece, both alined with each other, a series of independent carriers revolubly mounted in the frame and eccentrically with reference to the object-piece and eyepiece, so that they may be brought into line with the object and eye piece, and each of said carriers furnished with a substance capable of obscuring light, substantially as described.

2. The combination with a frame, of an object-piece, an eyepiece, both alined with each other, a series of independent carriers revolubly mounted in the frame and eccentrically with reference to the object-piece and eyepiece, so that they may be brought into line with the object and eye piece, and each of said carriers furnished with an opening and with different thicknesses of glasses having light-obscuring properties, substantially as described.

3. The combination with a frame, of an object-piece, an eyepiece, both alined with each other, a series of independent carriers revolubly mounted in the frame and eccentrically with reference to the object and eye piece so that they may be brought into line with the object and eye piece, each of said carriers furnished with an opening and with nests of glasses having light-obscuring properties, said opening and glasses being disposed eccentrically with reference to each other, substantially as described.

4. The combination with a frame, of an object-piece, an eyepiece, both alined with each other, a series of independent carriers revolubly mounted in the frame and eccentrically with reference to the object-piece and eyepiece so that they may be brought into line with the object and eye piece, each of said carriers furnished with an opening and with plural nests of glasses of different thicknesses having light-obscuring properties, and means for preventing accidental rotation of the carriers, substantially as described.

5. The combination with a frame, of an object-piece, an eyepiece, both alined with each other, a series of independent carriers revolubly mounted in the frame and eccentrically with reference to the object-piece and eyepiece so that they may be brought into line with the object and eye piece, each of said carriers furnished with an opening and with nests of glasses of different thicknesses having light-obscuring properties, said opening and glasses being disposed eccentrically with reference to each other, and detents mounted in the frame and acting to prevent accidental rotation of the carriers, substantially as described.

In testimony whereof I have hereunto signed my name.

EDWARD H. EARNSHAW.

In presence of—
GRACE B. HURLBUT,
K. M. GILLIGAN.